United States Patent [19]
Hablützel

[11] Patent Number: 5,773,759
[45] Date of Patent: Jun. 30, 1998

[54] SCREW-TYPE CONDUIT FITTING FOR A SHIELDED CABLE

[75] Inventor: Richard Hablützel, Birmensdorf, Switzerland

[73] Assignee: Agro AG, Hunzenschwill, Switzerland

[21] Appl. No.: 762,363

[22] Filed: Dec. 9, 1996

[30]     Foreign Application Priority Data

Dec. 7, 1995 [CH]  Switzerland ............................ 3460/95

[51] Int. Cl.⁶ ..................................................... H02G 3/18
[52] U.S. Cl. .......................... 174/65 R; 285/343; 248/56
[58] Field of Search ............................ 174/65 R, 65 SS; 285/342, 343, 162; 248/56; 16/2.1, 108; D13/133, 138, 146

[56]                References Cited

U.S. PATENT DOCUMENTS 3,744,008  7/1973  Castellani ................................... 248/56
4,350,840  9/1982  Michaels ............... 174/65 SS
4,739,126  4/1988  Gutter et al. ........................ 174/65 SS

*Primary Examiner*—Kristine L. Kincaid
*Assistant Examiner*—Dhiru R. Patel
*Attorney, Agent, or Firm*—McGlew & Tuttle

[57]                ABSTRACT

The new-type conduit fitting has at least a first, a second and a third part, through each part passes a hole which allows the parts to be pushed axially over the cable. The first part can be connected to a housing in an electrically conductive manner and can be axially tensioned with the third part. The second part is electrically conductive, and it reduces the cross section of its hole with increasing axial tensioning between the first and third parts. The hole of the first part expands conically against the second part, wherein the second part is a annular sleeve with a sheathing surface conically tapering against the first part and with a cylindrical inner surface, and the development of the annular sleeve has a shape meandering in a zigzag pattern. A fourth part formed as a rubber sleeve is positioned around the cable, and a fifth part formed as a union nut compresses the rubber sleeve between the union nut and the third part.

8 Claims, 1 Drawing Sheet

SCREW-TYPE CONDUIT FITTING FOR A SHIELDED CABLE

FIELD OF THE INVENTION

The present invention pertains to a screw-type conduit fitting with first, second and third parts. The second part is positioned between the first and third parts, and the first and third parts are axially tensioned so that the cross section of the second part can be reduced.

BACKGROUND OF THE INVENTION

Such a screw-type conduit fitting has been known. The sleeve-like second part is provided in it at one end with an annular section, from which finger-like projections distributed radially symmetrically extend to the other end. During the axial tensioning of the first part with the third part, the second part with the finger-like projections is pushed forward axially into a hole of the first part tapering in the manner of a funnel, wherein the free ends of the projections concentrically penetrate into the layer shielding the cable. The ends of the projections form a radially narrowing annular cutting edge, which penetrates into the cable and may damage same if the third part is tensioned with the first part too strongly.

SUMMARY AND OBJECTS OF THE INVENTION

The object of the present invention is therefore to improve a screw-type conduit fitting of the class described in the introduction such that a satisfactory contact can be established with it between the second part and the layer of shielding conductors without the risk of damage to the cable.

This object is accomplished according to the present invention by the first part having a conically expanding opening and the second part having a conically tapering surface which is positionable against the conically expanding opening of the first part. The second part is formed in a zigzag shape with alternating incisions extending from opposite axial ends of the second part. When the second part is forced into the conical opening of the first part, the cross section of the second part is reduced. The second part also has reduction limiting means for limiting the reducing of the cross section of the second part. This reduction limiting means includes flanks in the zigzag shape which contact each other when a proper or maximum amount of cross section reduction has occurred. The first part is directly electrically and physically connectable to a housing and means are provided for sealing the connection. features of claim 1.

The present invention offers the advantage that the length of the cylindrical contact surface can be selected to be comparatively large, which brings about a reliable electrical contact and a low radial compressive strain. Moreover, due to the design of the second part according to the present invention, the diameter of the cylindrical contact surface cannot be below a minimum, which offers additional safety against damage to the cable during the screw connection of the third part with the first one.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
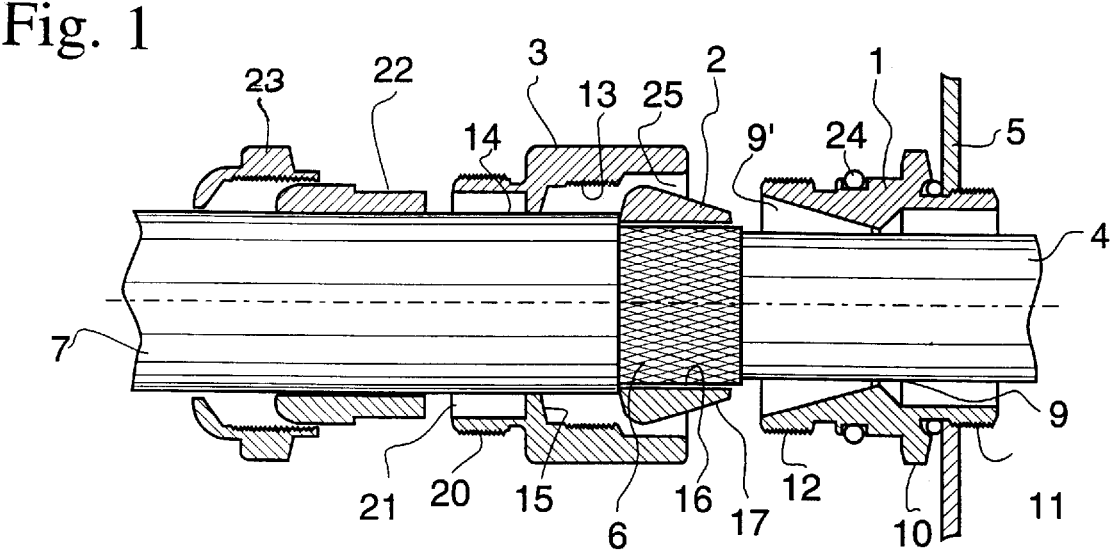
FIG. 1 is a longitudinal section through a screw-type conduit fitting.

The screw-type conduit fitting has essentially a first part 1, a second part 2, and a third part 3. It is used to introduce an electrical cable 4 into a grounded housing 5 in a shielded manner. The cable 4 is surrounded by an electrically conductive wire mesh tube 6, and the latter is surrounded by a flexible protective sheathing 7. The part 1, designed essentially as a body of rotation, has a hole 9, through which the cable 4 is pushed. Against the second part 2, the hole 9 forms a conical expansion 9', into which the second part 2 can be pushed, as will be described later. The first part 1 is provided on the outside with an annular rib 10, which is coaxial to the hole 9 and is joined by a threaded section 11 and 12 each on both sides. For the shielded introduction of a cable 4, the first part 1 is pushed with its thread 11 through a hole in the housing 5 and is then fastened by means of a nut, not shown, which is screwed onto the thread 11. The cable entry is protected from moisture by O-rings. For grounding, the first, conductive part 1 is connected to the housing 5 in an electrically conductive manner.

The third part 3 can be screwed onto the thread 12 of the first part 1 with a female thread 13. The thread 12 and 13 being a first fastening means. The female thread joins a hole 14, through which the cable 4 with the protective sheathing 7 surrounding it is pushed. An annular shoulder 15 joining the female thread 13 pushes the second part 2 axially into the conical expansion 9' of the hole 9 while the third part 3 is being screwed onto the first part 1.

Figure 2:
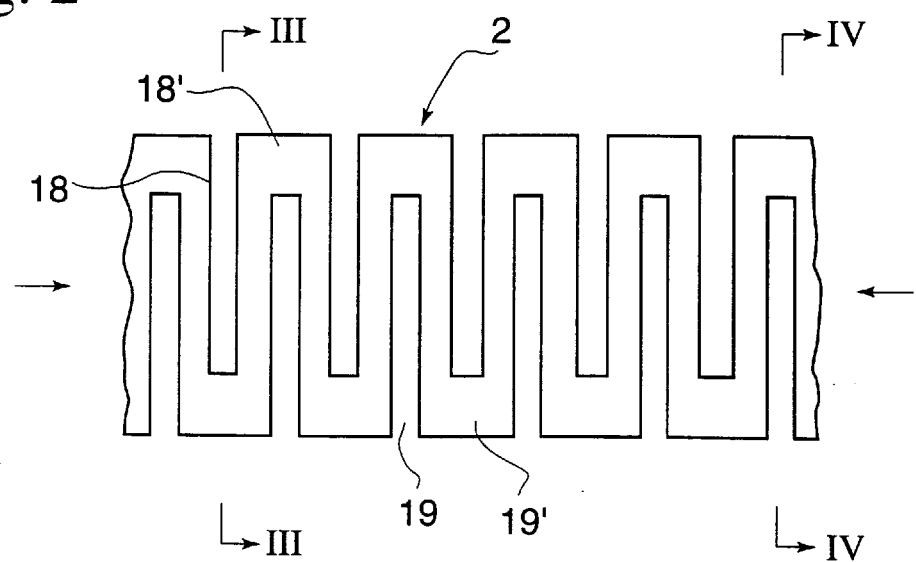
FIG. 2 is a developed view of part of the screw-type conduit fitting shown in FIG. 1.
Figure 3:
FIG. 3 is a sectional view along line Ill—Ill in FIG. 2.
Figure 4:
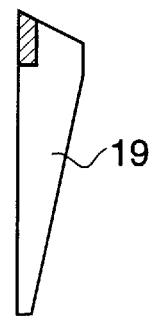
FIG. 4 is a sectional view along line IV—IV in FIG. 3.

The second part 2 is provided with a cylindrical hole 16 and a conical sheathing surface 17, which has the same cone angle as the conical expansion 9'. The second part 2 is, an electrically conductive annular sleeve, and is seated axially on a section of the wire mesh tube 6 projecting over the protective sheathing 7, the diameter of the hole 16 is somewhat smaller than that of the protective sheathing 7. The wall of the second part 2 has incisions 18 and 19 alternatingly from the front side and the rear side, which form webs 18' and 19' and impart a shape meandering in a zigzag pattern or shape to the developed view (Figure 2) of the second part 2. In the case of a concentric, radial application of force, which becomes established during pushing into the conical expansion 9', the cylindrical hole 16 of the second part 2 can decrease uniformly as a result and it can come into contact with the wire mesh tube 6 with a uniform distribution of pressure. The radial reduction in the cylindrical inner cross section of part 2 ends when the flanks touch each other at the open ends of the respective incisions 18 and 19.

To establish the screw-type conduit fitting, the cable 4, the wire mesh tube 6, and the protective sheathing 7 are prepared in the manner shown in FIG. 1. The first part 1 is then fastened to the housing, and the third part 3 is pushed over the cable end onto the protective sheathing 7. The second part 2 is then attached via the cable end to the projecting section of the wire mesh tube 6 such that its conically tapered sheathing surface converges toward the free cable end. The cable 4 is then pushed through the hole 9 and into the housing 5 to the extent that the second part 2 (pushed from the front end of the protective sheathing 7) is located in the conical expansion 9'. The third part 3 is subsequently screwed with its female thread 13 onto the thread 12 of the first part 1 and is tensioned axially until the second part 2 is pressed from the annular shoulder 15 into the conical expansion 9'and is radially compressed in the process to the extent that it snugly fits the wire mesh tube 6.

The screw-type conduit fitting is made water-tight by the fact that on the side facing away from the housing 5, the third part 3 has a threaded collar 20, which forms an annular space 21 around the protective sheathing 7. A fourth part such as a rubber sleeve 22 can be pushed into this annular space 21 and can be axially compressed with a fifth part such as a union nut 23 that can be screwed onto the threaded collar 20 to form a second fastening means. During the axial compression, the rubber sleeve 22 exerts a uniform radial pressure on the protective sheathing 7 and protects and seals an interface means the interior of the third part 3 against the penetration of water from the rear side-between the cable and the third part. At the same time, the axially compressed rubber sleeve 22 forms a pull-out securing means for the cable 4.

The third part 3 is provided with a conical sealing surface 25, which precedes the female thread 13, pushes itself sealingly over an O-ring 24 during the axial tensioning of the third part 3 with the first part 1 and forms a water barrier. While specific embodiments of the invention have been shown and described in detail to illustrate the application of the principles of the invention, it will be understood that the invention may be embodied otherwise without departing from such principles.

What is claimed is:

1. A conduit fitting for a shielded cable, the fitting comprising: a first part having a hole through which the cable can pass, said hole having a conically expanding shape, said first part having means for electrically connecting to a housing;

a second part having a hole with a cylindrical inner surface through which said cable can pass and formed as an annular sleeve of the cable, said second part being formed of electrically conductive material;

a third part having a hole through which said cable can pass, said third part being connectable to said first part and having a first fastening means for being axially tensioned with said first part, said second part being positionable to fit between said first and third part, said second part having a sheathing surface conically tapering and positionable against said conically expanding shape of said hole of said first part, said second part also being formed in a zig-zag shape for reducing a cross section of said hole of said second part when said first and third part are increasingly axially tensioned.

2. A fitting in accordance with claim 1, further comprising:

a fourth part having a hole through which said cable can pass, said fourth part being formed of rubber-elastic material;

a fifth part having a hole through which said cable can pass, said fifth part being connectable to said third part and having a second fastening means for being axially tensioned with said third part on a side of said third part diametrically opposite from said first part, said fourth part being positionable between said third and fifth part, said fourth part being compressible when said third and fifth part are axially tensioned.

3. A fitting in accordance with claim 2, wherein:
said first and second fastening means include threaded connections.

4. A fitting in accordance with claim 2, wherein:
said fourth part seals an interface between said third part and the cable.

5. A fitting in accordance with claim 1, wherein:
said zig-zag shape of said second part is formed by a plurality of incisions alternately extending inwards from opposite axial ends of said second part.

6. A fitting in accordance with claim 1, wherein:
said first part is directly electrically, and physically connected to the housing.

7. A fitting in accordance with claim 2, wherein:
said second part has reduction limiting means for limiting a reducing of said cross section of said hole of said second part.

8. A fitting in accordance with claim 7, wherein:
said reduction limiting means includes flanks in said zig-zag shape which contact each other when a proper amount of reduction has occurred.

* * * * *